(12) United States Patent
Chen

(10) Patent No.: US 11,644,171 B2
(45) Date of Patent: May 9, 2023

(54) VEHICLE PERIMETER LIGHTING ASSEMBLY AND LIGHTING METHOD

(71) Applicant: Ford Global Technologies, LLC, Dearborn, MI (US)

(72) Inventor: Linsheng Chen, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 425 days.

(21) Appl. No.: 16/773,159

(22) Filed: Jan. 27, 2020

(65) Prior Publication Data

US 2021/0231282 A1 Jul. 29, 2021

(51) Int. Cl.
| | | |
|---|---|---|
| F21S 41/32 | (2018.01) | |
| F21S 41/37 | (2018.01) | |
| F21S 41/20 | (2018.01) | |
| F21S 41/151 | (2018.01) | |
| F21S 41/39 | (2018.01) | |
| F21S 41/365 | (2018.01) | |
| F21S 41/147 | (2018.01) | |
| F21Y 103/10 | (2016.01) | |
| F21W 102/40 | (2018.01) | |
| F21Y 115/10 | (2016.01) | |

(52) U.S. Cl.
CPC .......... *F21S 41/321* (2018.01); *F21S 41/147* (2018.01); *F21S 41/151* (2018.01); *F21S 41/28* (2018.01); *F21S 41/365* (2018.01); *F21S 41/37* (2018.01); *F21S 41/39* (2018.01); *F21W 2102/40* (2018.01); *F21Y 2103/10* (2016.08); *F21Y 2115/10* (2016.08)

(58) Field of Classification Search
CPC .......... F21S 41/321; F21S 41/39; F21S 41/37; F21S 41/147; F21S 41/151; F21S 41/28; F21S 41/365; F21Y 2115/10; F21Y 2103/10; F21W 2102/40
See application file for complete search history.

(56) References Cited

U.S. PATENT DOCUMENTS

| | | | |
|---|---|---|---|
| 6,796,695 B2 | 9/2004 | Natsume | |
| 7,658,513 B2 | 2/2010 | Peck | |
| 8,197,105 B2 * | 6/2012 | Yang | A47F 3/001 362/346 |
| 8,807,789 B2 | 8/2014 | Peck | |
| 9,487,127 B2 * | 11/2016 | Salter | B60Q 1/323 |
| 9,616,811 B2 * | 4/2017 | Hulse | F21V 14/04 |
| 2007/0274096 A1 * | 11/2007 | Chew | G02B 6/0031 362/609 |

(Continued)

OTHER PUBLICATIONS

Byungwook Kim, Joongeok Kim, Won-Suk Ohm, and Shinill Kang, "Eliminating hotspots in a multi-chip LED array direct backlight system with optimal patterned reflectors for uniform illuminance and minimal system thickness," Opt. Express 18, 8595-8604 (2010).

*Primary Examiner* — Tsion Tumebo
(74) *Attorney, Agent, or Firm* — Vichit Chea; Carlson, Gaskey & Olds, P.C.

(57) ABSTRACT

A vehicle perimeter lighting assembly includes, among other things, a base having a concave area and a support ledge, a light source supported on the support ledge such that light from the light source is emitted toward the concave area, and a reflector lining the concave area. The reflector is configured to redirect light emitted from the light source toward an area around a vehicle.

20 Claims, 3 Drawing Sheets

(56) References Cited

U.S. PATENT DOCUMENTS

| | | | |
|---|---|---|---|
| 2009/0296383 A1* | 12/2009 | Valster | F21V 7/0008 |
| | | | 362/231 |
| 2010/0238660 A1* | 9/2010 | Miyairi | F21V 7/0008 |
| | | | 362/235 |
| 2012/0280528 A1 | 11/2012 | Dellock | |
| 2015/0175060 A1* | 6/2015 | Salter | B60Q 1/26 |
| | | | 362/510 |
| 2016/0061413 A1* | 3/2016 | Hedberg, Jr. | F21V 7/06 |
| | | | 362/147 |
| 2016/0258591 A1* | 9/2016 | Salter | B60Q 1/26 |
| 2017/0190282 A1* | 7/2017 | Salter | B60Q 1/50 |
| 2018/0257544 A1* | 9/2018 | Salter | B60R 9/06 |
| 2019/0009711 A1* | 1/2019 | Salter | B60Q 1/323 |

\* cited by examiner

VEHICLE PERIMETER LIGHTING ASSEMBLY AND LIGHTING METHOD

TECHNICAL FIELD

This disclosure relates generally to vehicle lighting and, more particularly, to illuminating areas around a perimeter of the vehicle using an assembly that has a reflector.

BACKGROUND

Vehicles can include supplemental exterior lighting (i.e., lighting other than headlamps and tail lamps). Examples of supplemental exterior lighting can include lights that illuminate areas around a perimeter of the vehicle, such as areas near doors of the vehicle. These lights can illuminate these areas when passengers are entering or exiting the vehicle.

SUMMARY

A vehicle perimeter lighting assembly according to an exemplary aspect of the present disclosure includes, among other things, a base having a concave area and a support ledge, a light source supported on the support ledge such that light from the light source is emitted toward the concave area, and a reflector lining the concave area. The reflector is configured to redirect light emitted from the light source toward an area around a vehicle.

In another example of the foregoing assembly, the base is mounted to a vehicle such that the vehicle perimeter lighting assembly extends longitudinally between a front wheel of the vehicle and a rear wheel of the vehicle.

In another example of any of the foregoing assemblies, the base is mounted to a vehicle such that the vehicle perimeter lighting assembly is disposed vertically beneath a door opening of the vehicle.

In another example of any of the foregoing assemblies, the area is on a driver side or a passenger side of the vehicle, and is between a front wheel and a rear wheel of the vehicle relative to a longitudinal axis of the vehicle.

In another example of any of the foregoing assemblies, the base is an extruded base.

In another example of any of the foregoing assemblies, the reflector is an extruded reflector that is coextruded within the extruded base.

In another example of any of the foregoing assemblies, the reflector is a metalized film.

Another example of any of the foregoing assemblies includes a lens that covers the concave area.

In another example of any of the foregoing assemblies, the light source comprises a plurality of light emitting diodes disposed along an axis of the vehicle perimeter lighting assembly.

In another example of any of the foregoing assemblies, the reflector is configured to redirect more light toward an outer region of the area than the inner region of the area.

In another example of any of the foregoing assemblies, the reflector is configured to redirect light to the area such that a maximum illuminance of the area due to the light is no more than three times a minimum illuminance of the area due to the light.

A vehicle perimeter lighting method according to another exemplary aspect of the present disclosure includes, among other things, emitting light from a lighting device in a direction that extends away from an area around a vehicle, and using a reflector to redirect the light emitted from the lighting device toward the area.

Another example of the foregoing method includes using the reflector to redirect more light toward an outer region of the area than the inner region of the area.

Another example of any of the foregoing methods includes using the reflector to redirect light to the area such that a maximum illuminance of the area due to the light is no more than three times a minimum illuminance of the area due to the light.

In another example of any of the foregoing methods, the area is on a driver side or a passenger side of the vehicle, and is between a front wheel and a rear wheel of the vehicle relative to a longitudinal axis of the vehicle.

Another example of any of the foregoing methods includes supporting the lighting device on a support ledge of a perimeter lighting base, and positioning the reflector within a concave area of the perimeter lighting base with the reflector.

Another example of any of the foregoing methods adhesively securing the reflector to the concave areas of the perimeter lighting base.

Another example of any of the foregoing methods includes coextruding the reflector with the perimeter lighting base.

Another example of any of the foregoing methods includes covering the concave area with a lens.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to lighting areas and, more particularly, to using a reflector to redirect light to these area around a vehicle. The reflecting can redirect light to provide consistently illuminated areas.

Figure 1:
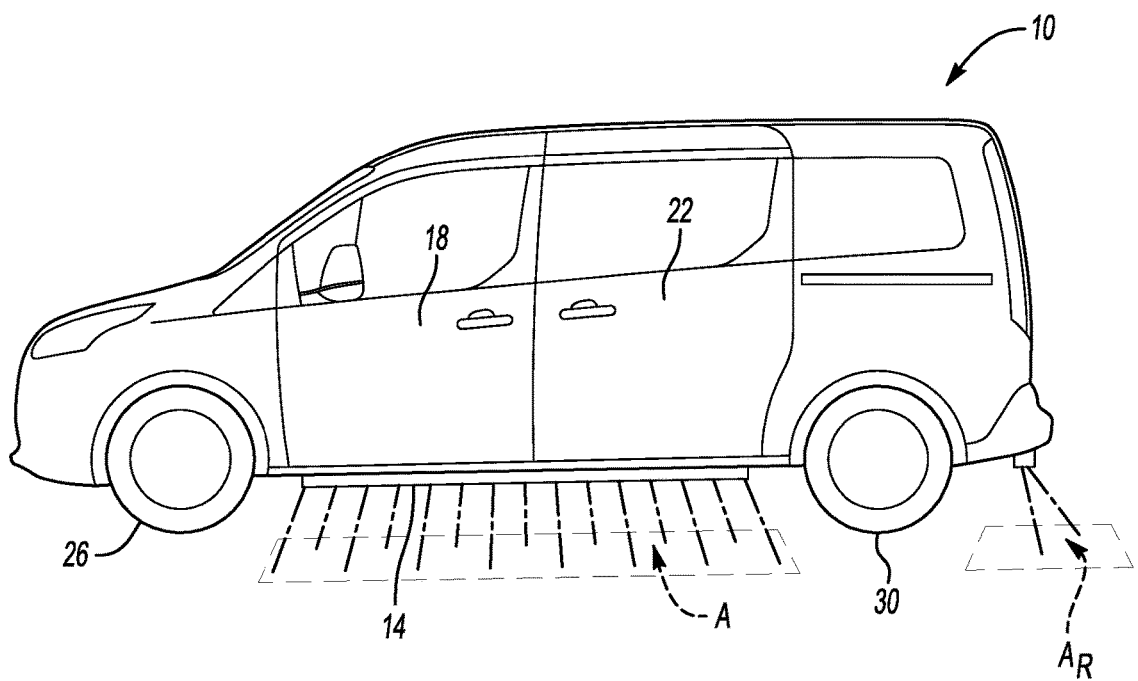
FIG. 1 shows a side view of an exemplary vehicle incorporating perimeter light assemblies.
Figure 2:
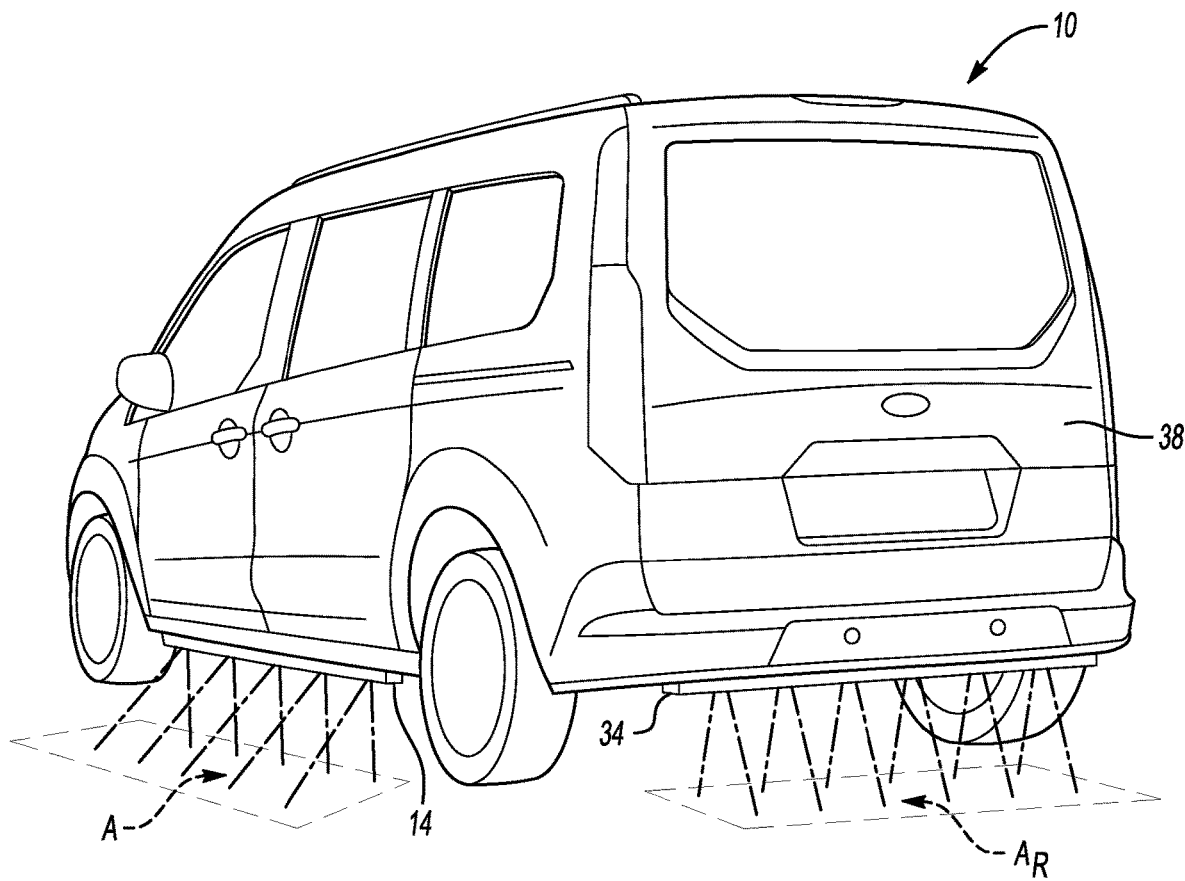
FIG. 2 shows a perspective partial view of the vehicle of FIG. 1 showing areas illuminated by the perimeter lighting assemblies.

With reference to FIGS. 1 and 2, an exemplary vehicle 10 includes a perimeter lighting assembly 14 on a driver side of the vehicle 10. The perimeter lighting assembly 14 can be used to illuminate an area A of the ground on a driver side of the vehicle 10. The area A is at a perimeter of the vehicle 10. The vehicle 10 can include another perimeter lighting assembly (not shown) on a passenger side that is used to illuminate an area of the ground on the passenger side of the vehicle 10.

The perimeter lighting assembly 14 is disposed vertically beneath a driver side front door 18 and a driver side rear door 22. Illuminating the area A can assist a passenger when entering or exiting a passenger cabin of the vehicle 10 through the front door 18 or the rear door 22 in dark conditions.

The perimeter lighting assembly 14, in the exemplary embodiment, extends longitudinally from a position vertically beneath the front door 18 to a position vertically beneath the rear door 22. The perimeter lighting assembly 14 is positioned axially between a front wheel 26 and a rear wheel 30 of the vehicle 10 relative to a longitudinal axis of the vehicle 10.

The example vehicle 10 further includes a perimeter lighting assembly 34 vertically beneath rear doors 38 of the vehicle 10. The perimeter lighting assembly 34 can be used to illuminate an area $A_R$ of the ground at a rear of the vehicle 10. Illuminating the area $A_R$ can help a passenger entering or exiting the vehicle 10 through the rear doors 38.

Due to the inverse square law, illuminance is lost the further that light must travel from a light source to a target area. In the past, prior art perimeter lighting assemblies having illuminated areas by using direct fire LEDs to emit light directly outward away from a vehicle (i.e., without reflecting). This resulted in outer regions of the illuminated area that are further from the vehicle being illuminated much less than the inner regions closer to the vehicle and led to readily perceived hot-spots of light near the vehicle, which can be objectionable. In some examples, a maximum illuminance within an area illuminated by such a prior art perimeter lighting assembly was more than ten times a minimum illuminance within that area.

The perimeter lighting assembly 14 is configured to provide relatively consistent illumination throughout the area A. That is, the area A, when illuminated, lacks objectionable "hot spots" of light. In an example, a maximum illuminance within the area A due to light from the perimeter lighting assembly 14 is no more than three times a minimum illuminance of within the area A due to light from the perimeter lighting assembly 14. Thus, the perimeter lighting assembly 14 can provide 3 to 1 uniformity throughout the area A. In some examples, the perimeter lighting assembly can provide at least 300 lux throughout the area A. In a specific example, the area A can be 1,650 millimeters long and 500 meters wide. The perimeter lighting assembly 34 can be configured similarly to the perimeter lighting assembly 14 to avoid hot spots of light within the area $A_R$.

Figure 3:
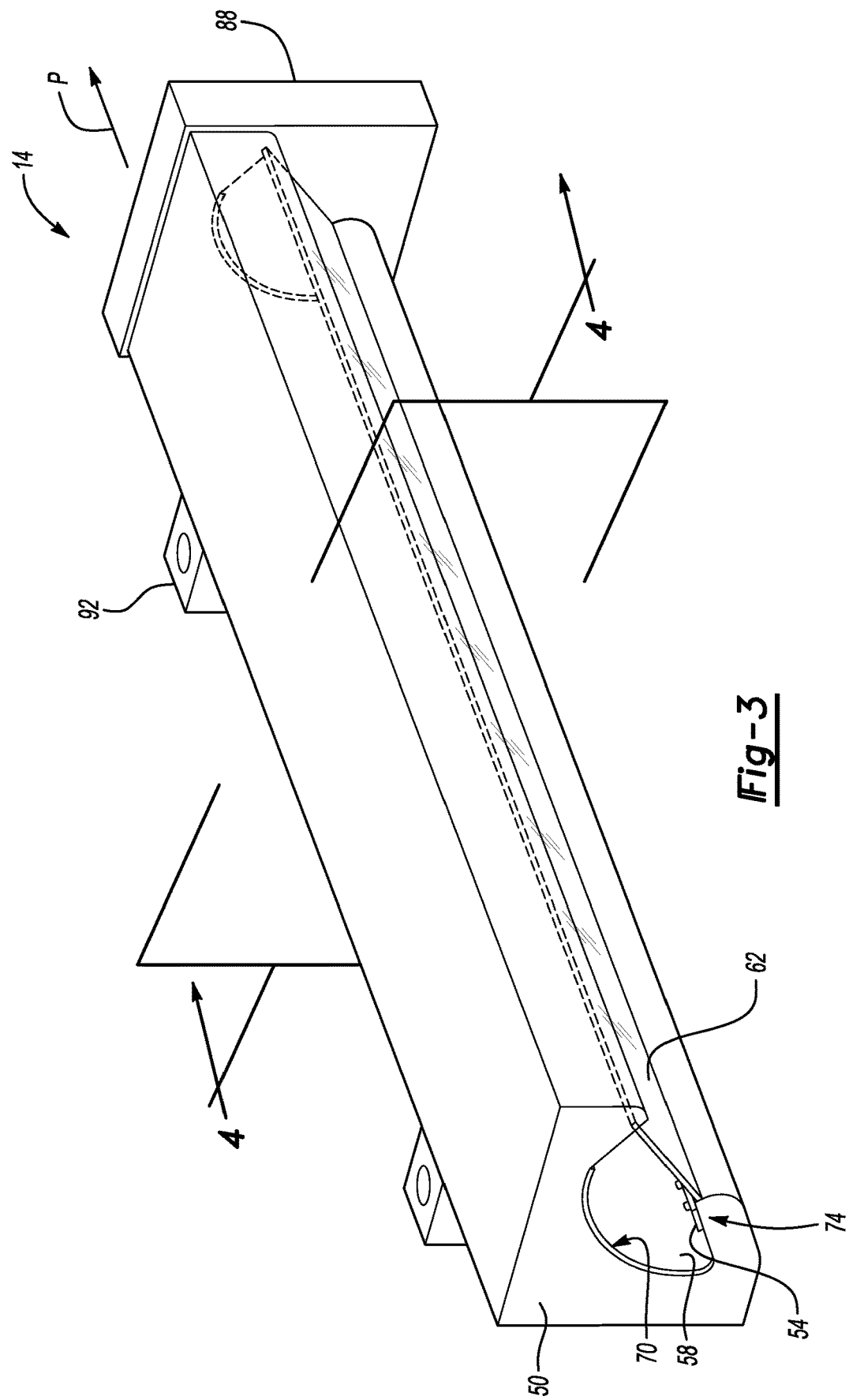
FIG. 3 shows an exemplary perimeter lighting assembly for the vehicle of FIGS. 1 and 2.
Figure 4:
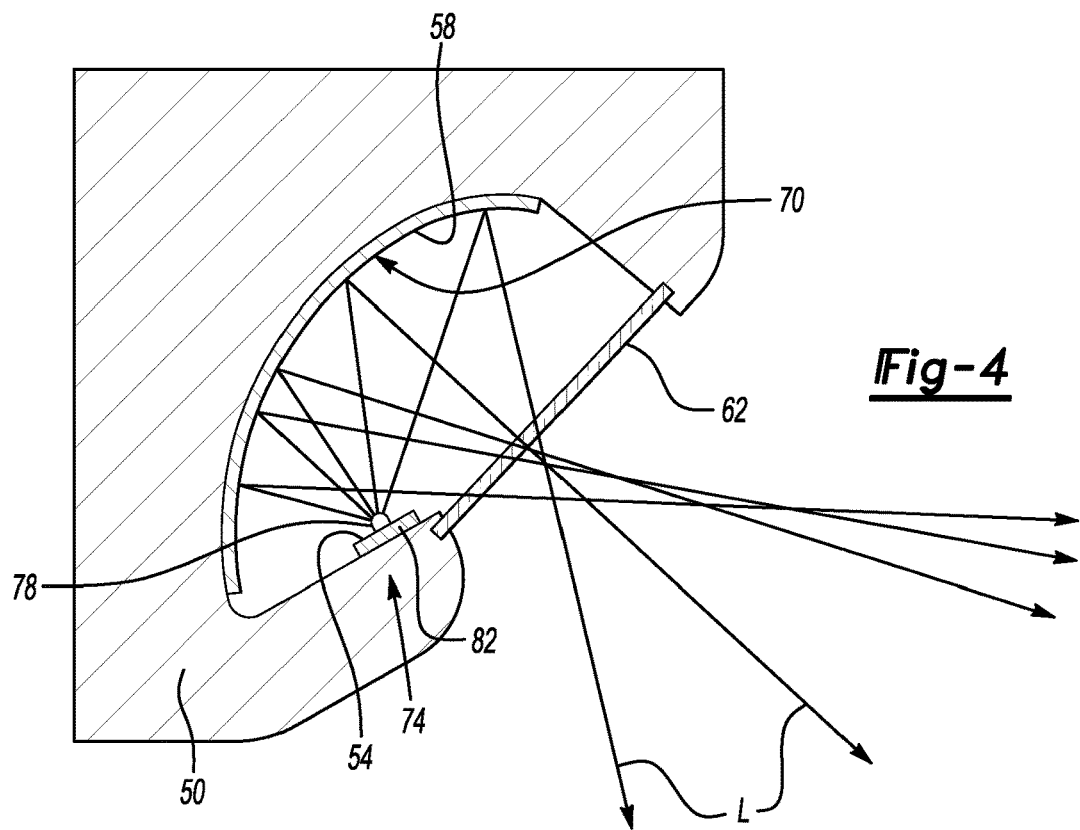
FIG. 4 shows a section view at line 4-4 in FIG. 3.

With reference now to FIGS. 3 and 4, the perimeter lighting assembly 14 is configured to reduce hot-spots within the area A. The perimeter lighting assembly 14 includes a base 50, a light source 54, a reflector 58, and a lens 62. The base 50 has a concave area 70 and a support ledge 74. The perimeter lighting assembly 14 extends longitudinally along a perimeter lighting axis P. The perimeter lighting assembly 14 extends longitudinally along a longitudinal axis of the vehicle 10, and is positioned such that the lens 62 faces outward away from a centerline of the vehicle 10.

In the exemplary embodiment, the light source 54 is supported on the support ledge 74 of the base 50. The light source 54 includes a plurality of light emitting diodes (LEDs) 78 disposed on a printed circuit board (PCB) 82. The light source 54 can further include a heat sink (not shown). The LEDs 78 are distributed axially along the PCB 82. Each of the LEDs 78 can be spaced, for example, 100 millimeters away from an axially adjacent LED 78.

The LEDs 78 are operably coupled to a power source and a lighting controller of the vehicle 10 through the PCB 82 and other components. The lighting controller of the vehicle 10 can command the LEDs 78 on, which causes the LEDs 78 to emit light, and thus the light source 54 to emit light. Notably, the light source 54 is supported on the support ledge 74 such that light emitted from the light source 54 is emitted toward the concave area 70 of the base 50, and away from the area A.

The reflector 58 lines the concave area 70 of the base 50. The reflector 58 can be a metalized coating. The reflector 58 could be, for example, a metallic film. In another example, the reflector 58 is a polymer-based reflective material.

In some examples, the base 50 is extruded from a polymer-based material, and the reflector 58 is coextruded with the base 50 such that the reflector 58 lines the concave area 70 of the extruded base 50. A person having skill in this art and the benefit of this disclosure would understand how to structurally distinguish an extruded base and extruded reflector from a base that is not extruded and a reflector that is not extruded. Thus, specifying that the base 50 is an extruded base implicates structure to the exemplary base 50. Further, specifying that the reflector 58 is an extruded reflector can implicate structure to the reflector 58.

In another example, the reflector 58 is adhesively secured to the concave area 70 after forming the base 50. An adhesive, such as an ultraviolet cured adhesive, could be used to attach such a reflector 58 to the concave area 70 of the base 50.

The reflector 58 lining the concave area 70 is a concave reflector as the reflector 58 lines the concave area 70. The reflector 58 is configured to redirect light emitted from the light source 54 toward the area A. The light emitted by the light source 54 and redirected by the reflector 58 is represented schematically in FIG. 4 as light L. The reflector 58 can defocus the light L or focus the light L when redirecting. Defocusing can help to blend light within the area A.

The geometry of the reflector 58, and the position of the reflector 58 relative to the light source 54 cause the reflector to redirect more light to the outer regions of the area A that are further from the vehicle 10 than the inner regions of the area A that are closer to the vehicle 10. Light traveling from the perimeter lighting assembly 14 to the outer regions of the area A needs to travel a greater distance than light moving from the perimeter lighting assembly 14 to the inner regions. Reflecting more light to the outer regions of the area A compensates for illuminance that is lost as light travels. Thus the light source 54, in combination with reflector 58, can provide relatively consistent illumination throughout the area A.

The lens 62 can protect the light source 54, the reflector 58, and other parts of the perimeter lighting assembly 14. The lens 62 can be a clear, polymer-based material, such as polycarbonate. Rocks and debris can be redirected away from the perimeter lighting assembly 14 due to the lens 62.

Longitudinal ends of the perimeter lighting assembly 14 are covered by caps 88 in this example. FIG. 3 shows the perimeter lighting assembly 14 with one of the caps being removed for drawing clarity. The caps 88 can cover the openings at the longitudinal ends of the perimeter lighting assembly 14.

Mounting features 92 can be attached to the base 50. Mechanical fasteners, such as screws or bolts, can engage the mounting features 92 and portions of the vehicle 10 to secure the perimeter lighting assembly 14 relative to the other portions of the vehicle 10.

The perimeter lighting assembly 14 is described above in connection with FIGS. 3 and 4. The perimeter lighting assembly 34 can be similarly constructed.

While the exemplary perimeter lighting assembly 14 extends linearly along the perimeter lighting axis P, other perimeter lighting assemblies could be curved relative to a linear axis. For example, the lighting assembly 34 could be curved to match a curve at a rear of the vehicle 10. If the lighting assembly is curved along its longitudinal axis, the lighting assembly could be injection molded to facilitate providing the curved shape.

Figure 5:
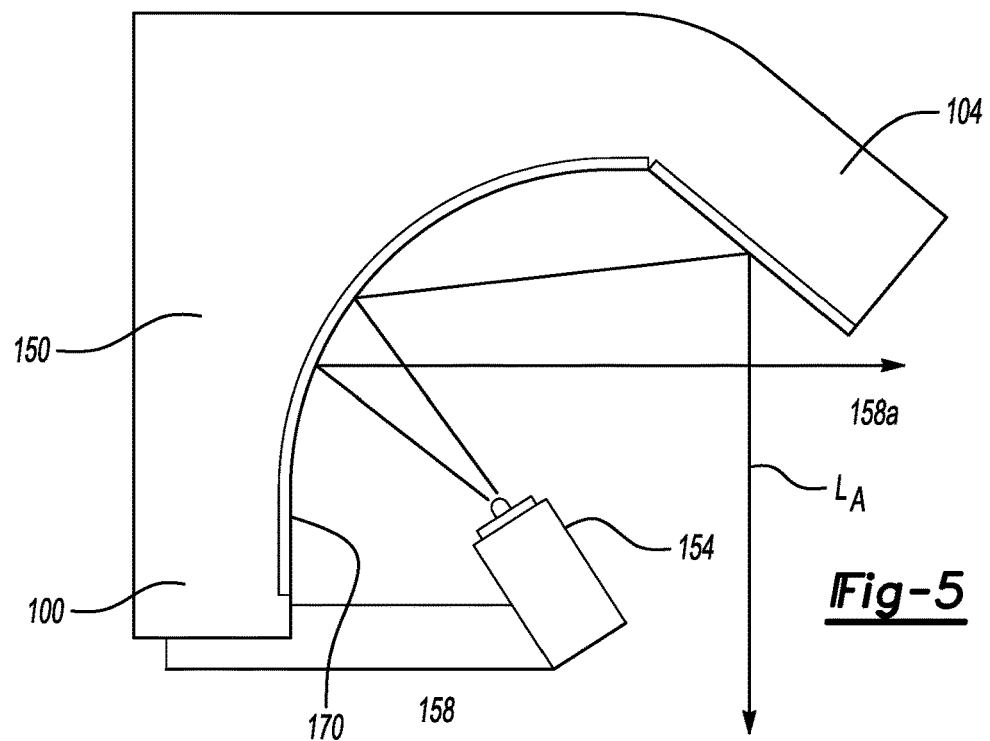
FIG. 5 shows a section view of a perimeter lighting assembly according to another exemplary embodiment of the present disclosure.

With reference to FIG. 5, another exemplary perimeter lighting assembly 100 can include a first reflector 158 lining a concave area 170 of a base 150 in a manner similar to that described in connection with FIGS. 3 and 4. The perimeter lighting assembly 100 further includes a second reflector 158A lining a support arm 104 of the base 150. In an example, some of the light $L_A$ emitted from a lighting device 154 of the perimeter lighting assembly 100 is emitted first toward the first reflector 158. The first reflector 158 then redirects the light $L_A$ toward the second reflector 158A, which redirects the light $L_A$ downward. The second reflector 158A can be used in the perimeter lighting assemblies where lighting an area very close to the vehicle is desired.

Notably, some light emitted from the lighting device 154 can be redirected by the first reflector 158 and emitted from the perimeter lighting assembly 100 without being redirected further by the second reflector 158A.

While the exemplary lighting assemblies are described in connection with a vehicle, the lighting assemblies could be used in other areas. For example, the lighting assemblies could be used to illuminate areas in warehouses, along streets, within parking garages, along walkways, etc. In a specific example, the lighting assemblies could be used to illuminate a supermarket refrigerator.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle perimeter lighting assembly, comprising:
    a base having a concave area and a support ledge;
    a light source supported on the support ledge such that light from the light source is emitted toward a portion of the concave area that is inboard the light source; and
    a reflector lining the concave area, the reflector configured to redirect light emitted from the light source toward an area around a vehicle.

2. The vehicle perimeter lighting assembly of claim 1, wherein the base is mounted to a vehicle such that the vehicle perimeter lighting assembly extends longitudinally between a front wheel of the vehicle and a rear wheel of the vehicle.

3. The vehicle perimeter lighting assembly of claim 1, wherein the area is on a driver side or a passenger side of the vehicle, and is between a front wheel and a rear wheel of the vehicle relative to a longitudinal axis of the vehicle.

4. The vehicle perimeter lighting assembly of claim 1, wherein the base is an extruded base.

5. The vehicle perimeter lighting assembly of claim 4, wherein the reflector is an extruded reflector that is coextruded within the extruded base.

6. The vehicle perimeter lighting assembly of claim 1, wherein the reflector is a metalized film.

7. The vehicle perimeter lighting assembly of claim 1, further comprising a lens that covers the concave area.

8. The vehicle perimeter lighting assembly of claim 1, wherein the light source comprises a plurality of light emitting diodes disposed along an axis of the vehicle perimeter lighting assembly.

9. The vehicle perimeter lighting assembly of claim 1, wherein the reflector is configured to redirect more light toward an outer region of the area than the inner region of the area.

10. The vehicle perimeter lighting assembly of claim 1, wherein the reflector is configured to redirect light to the area such that a maximum illuminance of the area due to the light is no more than three times a minimum illuminance of the area due to the light.

11. The vehicle perimeter lighting assembly of claim 1, wherein the reflector is configured to redirect light emitted inboard to a position that is outboard the light source.

12. The vehicle perimeter lighting method of claim 10, wherein at least a portion of the reflector is inboard the lighting device, and the portion redirects the light emitted from the lighting device outboard toward the area.

13. A vehicle perimeter lighting method, comprising:
    emitting light from a lighting device in a direction, the direction extending away from an area around a vehicle, the direction extending toward a centerline of the vehicle; and
    using a reflector to redirect the light emitted from the lighting device toward the area.

14. The vehicle perimeter lighting method of claim 13, further comprising using the reflector to redirect more light toward an outer region of the area than the inner region of the area.

15. The vehicle perimeter lighting method of claim 13, further comprising using the reflector to redirect light to the area such that a maximum illuminance of the area due to the light is no more than three times a minimum illuminance of the area due to the light.

16. The vehicle perimeter lighting method of claim 13, wherein the area is on a driver side or a passenger side of the vehicle, and is between a front wheel and a rear wheel of the vehicle relative to a longitudinal axis of the vehicle.

17. The vehicle perimeter lighting method of claim 13, further comprising supporting the lighting device on a support ledge of a perimeter lighting base, and positioning the reflector within a concave area of the perimeter lighting base with the reflector, wherein at least a portion of the reflector that redirects the light is disposed inboard from the lighting device and the perimeter lighting base.

18. The vehicle perimeter lighting method of claim 17, further comprising adhesively securing the reflector to the concave areas of the perimeter lighting base.

19. The vehicle perimeter lighting method of claim 18, further comprising coextruding the reflector with the perimeter lighting base.

20. The vehicle perimeter lighting method of claim 18, further comprising covering the concave area with a lens.

* * * * *

UNITED STATES PATENT AND TRADEMARK OFFICE
CERTIFICATE OF CORRECTION

| | | |
|---|---|---|
| PATENT NO. | : 11,644,171 B2 | Page 1 of 1 |
| APPLICATION NO. | : 16/773159 | |
| DATED | : May 9, 2023 | |
| INVENTOR(S) | : Chen | |

It is certified that error appears in the above-identified patent and that said Letters Patent is hereby corrected as shown below:

In the Claims

Claim 12, Column 6, Line 28, change "method" to --assembly--.

Claim 12, Column 6, Lines 30 and 31, change "device" to --source--.

Signed and Sealed this
Thirteenth Day of June, 2023

Katherine Kelly Vidal
*Director of the United States Patent and Trademark Office*